United States Patent
Tomizawa et al.

(10) Patent No.: US 10,699,652 B2
(45) Date of Patent: Jun. 30, 2020

(54) SIGNAL PROCESSING DEVICE AND DISPLAY DEVICE HAVING THE SAME

(71) Applicant: Japan Display Inc., Minato-ku (JP)

(72) Inventors: Kazunari Tomizawa, Minato-ku (JP); Kazuhiko Sako, Minato-ku (JP); Yasuo Saruhashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 157 days.

(21) Appl. No.: 16/012,131

(22) Filed: Jun. 19, 2018

(65) Prior Publication Data
US 2018/0374437 A1  Dec. 27, 2018

(30) Foreign Application Priority Data
Jun. 21, 2017  (JP) .................. 2017-121244

(51) Int. Cl.
*G09G 3/36* (2006.01)
*G09G 5/02* (2006.01)
(Continued)

(52) U.S. Cl.
CPC ..... *G09G 3/3607* (2013.01); *G02F 1/133603* (2013.01); *G09G 3/3413* (2013.01);
(Continued)

(58) Field of Classification Search
CPC .. G09G 5/02; G09G 5/04; G09G 5/06; G09G 5/10; G09G 3/36; G09G 3/20; G09G 3/32; G09G 3/30; G09G 3/34; G09G 3/3208; G09G 3/3255; G09G 9/30; G02F 1/1335; F21V 8/00; H04N 9/68; H04N 3/14
See application file for complete search history.

(56) References Cited

U.S. PATENT DOCUMENTS

| 2009/0207182 A1* | 8/2009 | Takada .............. G09G 3/3406 345/589 |
| 2009/0213048 A1* | 8/2009 | Park ................... G09G 3/2003 345/77 |

(Continued)

FOREIGN PATENT DOCUMENTS

| JP | 11-65531 | 3/1999 |
| JP | 2012-27397 | 2/2012 |
| JP | 2015-197461 | 11/2015 |

*Primary Examiner* — Chanh D Nguyen
*Assistant Examiner* — Nguyen H Truong
(74) *Attorney, Agent, or Firm* — Oblon, McClelland, Maier & Neustadt, L.L.P.

(57) ABSTRACT

A signal processing device includes an elongation coefficient calculation circuit receiving a first image signal including a red pixel value, a green pixel value and a blue pixel value, and determining an elongation coefficient value with respect to one frame based on the first image signal, and an image signal processing circuit receiving the first image signal and the elongation coefficient value. The image signal processing circuit includes an image signal conversion circuit converting the first image signal into a second image signal including a red pixel value, a green pixel value, a blue pixel value and a white pixel value, an elongation processing circuit elongating the second image signal based on the elongation coefficient value, an image signal analysis circuit analyzing the elongated second image signal, and an adjustment circuit adjusting the elongated second image signal.

8 Claims, 9 Drawing Sheets

(51) Int. Cl.
*G02F 1/13357* (2006.01)
*H04N 9/67* (2006.01)
*G09G 3/34* (2006.01)

(52) U.S. Cl.
CPC ......... *G09G 3/3426* (2013.01); *G09G 3/3648* (2013.01); *G09G 5/02* (2013.01); *G09G 5/026* (2013.01); *H04N 9/67* (2013.01); *G09G 2300/023* (2013.01); *G09G 2300/0452* (2013.01); *G09G 2310/0235* (2013.01); *G09G 2320/0646* (2013.01); *G09G 2330/021* (2013.01); *G09G 2340/0457* (2013.01)

(56) References Cited

U.S. PATENT DOCUMENTS

| | | | |
|---|---|---|---|
| 2012/0026210 A1 | 2/2012 | Yano et al. | |
| 2013/0106901 A1* | 5/2013 | Inada | G09G 3/3406 345/600 |
| 2015/0109350 A1* | 4/2015 | Gotoh | G09G 3/3607 345/690 |

* cited by examiner

SIGNAL PROCESSING DEVICE AND DISPLAY DEVICE HAVING THE SAME

CROSS REFERENCE TO RELATED APPLICATIONS

This application is based upon and claims the benefit of priority from the prior Japanese Patent Application No. 2017-121244, filed on Jun. 21, 2017, the entire contents of which are incorporated herein by reference.

FIELD

The present invention is related to a signal processing device and a display device having the same.

BACKGROUND

Liquid crystal display devices are used in various fields as OA devices such as televisions and personal computers, mobile terminal devices, and image display devices such as digital signage. Together with an increase in functionality of devices such as televisions, OA devices and mobile terminal devices described above, on which liquid crystal display devices are mounted, improvement in display performance and reduction in power consumption of liquid crystal display devices are required.

A liquid crystal display device has a display panel including a liquid crystal layer sandwiched between two alignment films and a backlight which supplies light to the display panel. A CCFL (Cold Cathode Fluorescent Lamp) and a light emitting diode (LED: Light Emitting Diode) are examples of a light source of a backlight used in a liquid crystal display device.

In a liquid crystal display device, one pixel is generally formed from three subpixels which display red, green and blue (RGB) which are three primary colors of light. In recent years, in order to improve image resolution, luminosity and reduce power consumption, an image display device has been proposed in which a pixel including four subpixels displaying red, green, blue and white (RGBW) with a white (W) subpixel generally added to red, green and blue (RGB) subpixels is applied to a display panel. In such an image display device, an RGB image signal input from the outside is converted to an RGBW image signal suitable for the image display device. Since it is possible to improve luminosity efficiency by using a white (W) subpixel, it is possible to reduce the amount of light emitted by the backlight.

In addition, a method is known in which power consumption of the backlight is reduced by elongating an image signal and reducing the amount of light emitted from the backlight by the amount corresponding to the elongation of the image signal.

SUMMARY

A signal processing device according to one embodiment of the present invention includes an elongation coefficient calculation circuit receiving a first image signal including a red pixel value, a green pixel value and a blue pixel value, and determining an elongation coefficient value with respect to one frame based on the first image signal, and an image signal processing circuit receiving the first image signal and the elongation coefficient value, wherein the image signal processing circuit includes an image signal conversion circuit converting the first image signal into a second image signal including a red pixel value, a green pixel value, a blue pixel value and a white pixel value, an elongation processing circuit elongating the second image signal based on the elongation coefficient value, an image signal analysis circuit analyzing the elongated second image signal and determining whether the red pixel value, the green pixel value and the blue pixel value included in the second image signal are a predetermined threshold value or less, and an adjustment circuit adjusting the elongated second image signal based on an amount by which the predetermined threshold value is exceeded in the case where any one among the red pixel value, the green pixel value and the blue pixel value included in the second image signal exceed the predetermined threshold value.

A display device according to one embodiment of the present invention includes a display panel displaying an image, a backlight supplying light to the display panel, a data drive circuit supplying an image voltage to the display panel, a backlight drive circuit driving the backlight, and a signal processing device, wherein the signal processing device includes an elongation coefficient calculation circuit receiving a first image signal including a red pixel value, a green pixel value and a blue pixel value, and determining an elongation coefficient value with respect to one frame based on the first image signal of one frame, and an image signal processing circuit receiving the first image signal and the elongation coefficient value, the image signal processing circuit includes an image signal conversion circuit converting the first image signal into a second image signal including a red pixel value, a green pixel value, a blue pixel value and a white pixel value, an elongation processing circuit elongating the second image signal based on the elongation coefficient value, an image signal analysis circuit analyzing the elongated second image signal and determining whether the red pixel value, the green pixel value and the blue pixel value included in the second image signal are a predetermined threshold value or less, and an adjustment circuit reducing the red pixel value, the green pixel value, the blue pixel value included in the second image signal and increasing the white pixel value included in the second image signal based on an amount by which the predetermined threshold value is exceeded in the case where any one among the red pixel value, the green pixel value and the blue pixel value included in the second image signal exceeds the predetermined threshold value, the backlight drive circuit drives the backlight based on the elongated coefficient value, and the data drive circuit generates the image voltage based on the second image signal adjusted by the adjustment circuit based on the amount by which the predetermined threshold value is exceeded in the case where any one of the elongated second image signal or the red pixel value, the green pixel value and the blue pixel value included in the second image signal exceeds the predetermined threshold value.

DESCRIPTION OF EMBODIMENTS

Figure 1:
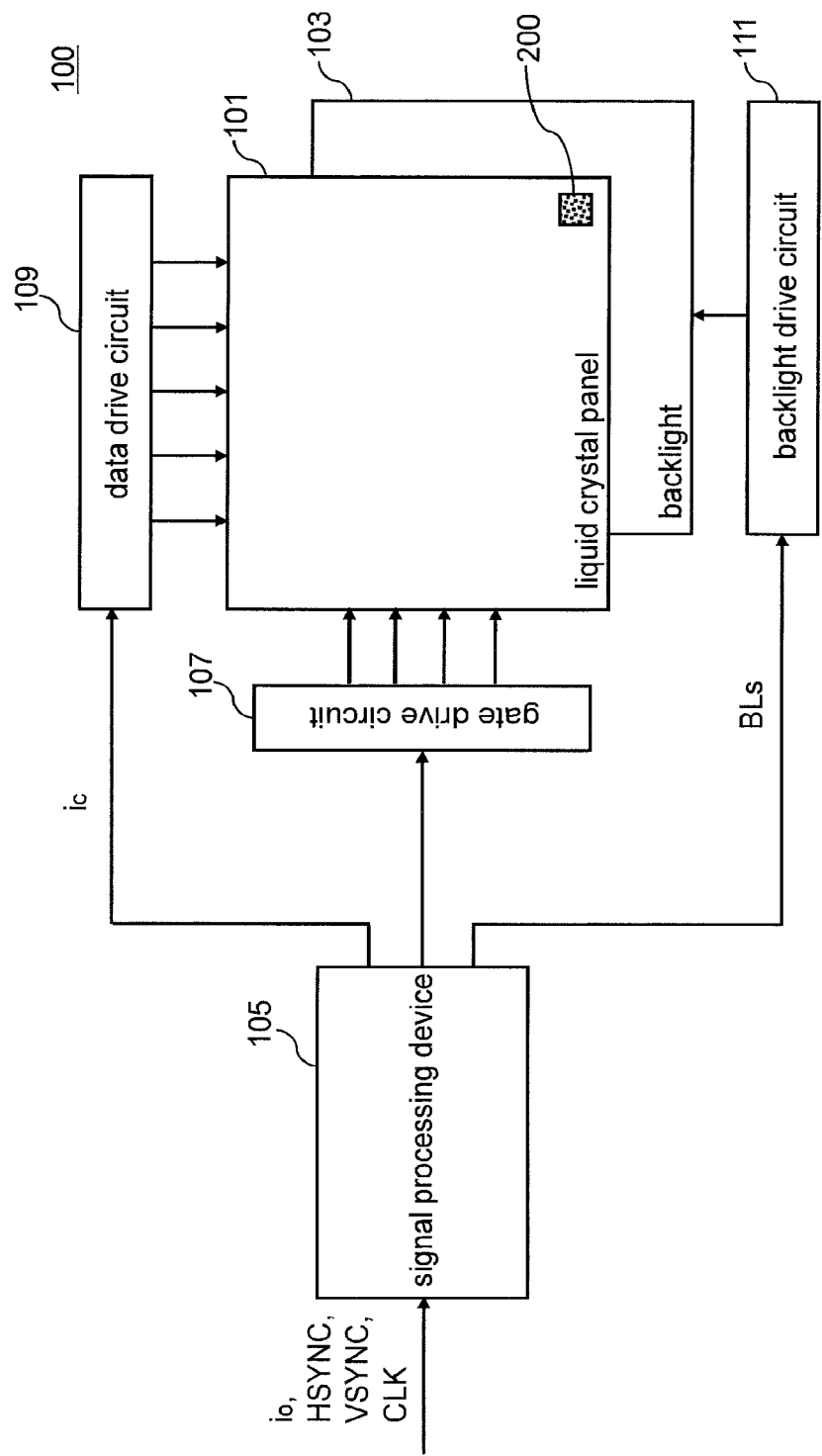
FIG. 1 is a block diagram showing a summary of a liquid crystal display device related to one embodiment of the present invention.

In order to further reduce the power consumption of a liquid crystal display device, it is conceivable reduce power consumption in a backlight while maintaining image resolution and luminosity by elongating an RGBW image signal for displaying red, green, blue and white (RGBW) included in one pixel and reducing the light emission amount of the backlight by that amount. However, in the case when an RGBW image signal is generated by converting an RGB image signal and the generated RGBW image signal is elongated, an overflow occurs which shifts the hue of the image so that an image based on the original RGB image signal can not be displayed. An object of one embodiment of the present invention is to provide a liquid crystal display device with reduced power consumption while maintaining display performance.

The embodiments of the present invention are explained below while referring to the drawings. Furthermore, the disclosure is merely an example, and the present invention can be implemented in various modes without departing from the gist of the invention and should not to be interpreted as being limited to the description of the embodiments exemplified below. In addition, although the drawings may be schematically represented in terms of width, thickness, shape, and the like of each part as compared with their actual mode in order to make explanation clearer, it is only an example and an interpretation of the present invention is not limited. In addition, in the present specification and each drawing, the same reference numerals are provided to the same elements as those described above with reference to preceding figures and a detailed explanation may be omitted accordingly.

In the present specification and the scope of the patent claims, when expressing a mode in which another structure is arranged above a certain structure, in the case where it is simply described as "above", unless otherwise noted, a case where another structure is arranged directly above a certain structure as if in contact with that structure, and a case where another structure is arranged via another structure above a certain structure, are both included.

Overall Structure

A liquid crystal display device according to one embodiment of the present invention is explained below while referring to FIG. 1 to FIG. 9. FIG. 1 is a block diagram showing a summary of a liquid crystal display device according to one embodiment of the present invention. The liquid crystal display device 100 displays an image based on an image signal $i_o$ which is externally input. The liquid crystal display device 100 includes a liquid crystal panel 101, a backlight 103, a signal processing device 105, a gate drive circuit 107, a data drive circuit 109 and a backlight drive circuit 111.

The liquid crystal panel 101 modulates light from the backlight 103 based on the image signal $i_o$ and displays an image based on the image signal $i_o$. The liquid crystal panel 101 includes a plurality of pixels 200. The plurality of pixels 200 may be arranged in a matrix.

Figure 2:
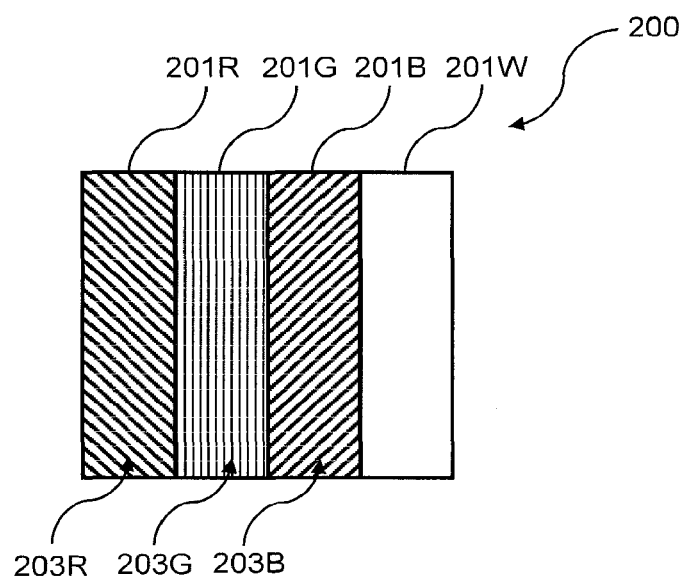
FIG. 2 is a schematic diagram showing an example of a structure of a pixel.

FIG. 2 is a schematic diagram showing an example of the structure of a pixel 200. As is shown in FIG. 2, the pixel 200 includes a subpixel 201R which displays red (R), a subpixel 201G which displays green (G), a subpixel 201B which displays blue (B) and a white subpixel 201W which displays white. Color filters are arranged corresponding to each subpixel 201R, 201G, and 201B respectively. The subpixel 201R is arranged with a color filter 203R corresponding to red (R). The sub-pixel 201G is arranged with a color filter 203G corresponding to green (G). The sub-pixel 201B is arranged with a color filter 203B corresponding to blue (B).

Figure 3:
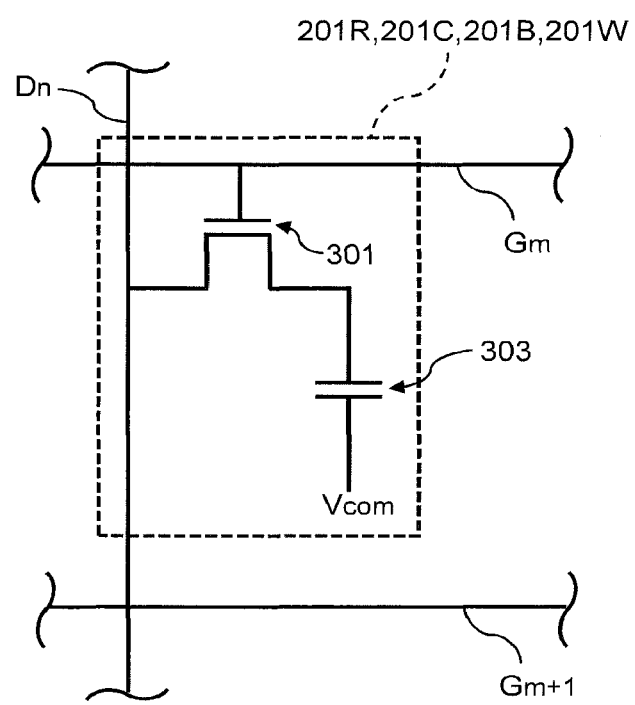
FIG. 3 is a circuit diagram showing an example of a structure of a pixel circuit of a subpixel.

FIG. 3 is a circuit diagram showing an example of a structure of a pixel circuit of each of the subpixels 201R, 201G, 201B and 201W. The pixel circuit of each of the subpixels 201R, 201G, 201B and 201W includes a TFT 301 and a liquid crystal element 303. Each of the subpixels 201R, 201G, 201B and 201W is respectively connected to a gate line Gm (m is a natural number) for selecting a pixel to be driven and a data line Dn (n is a natural number) for supplying an image voltage to the pixel to be driven.

The TFT 301 is a switching element for supplying an image voltage to the liquid crystal element 303. The TFT 301 may be a MOSFET. The gate of the TFT 301 is electrically connected to the gate line Gm. One end of the TFT 301 is electrically connected to the liquid crystal element 303 and the other end is electrically connected to the data line Dn.

The liquid crystal element 303 includes a pair of electrodes (not shown in the diagram) and a liquid crystal layer (not shown in the diagram) sandwiched between the pair of electrodes. The liquid crystal layer 303 includes, for example, a TN (Twisted Nematic) liquid crystal, a VA (Vertical Alignment) liquid crystal and an IPS (In Place Switching) liquid crystal and the like. One of the pair of electrodes of the liquid crystal element 303 is electrically connected to one end of the TFT 301 and receives an image voltage supplied via the data line Dn. The other electrode of the pair of electrodes of the liquid crystal element 303 is electrically connected to wiring (not shown in the diagram) for supplying a common voltage and receives a common voltage. Furthermore, the other electrode may be connected to ground.

The backlight 103 is a light source part which supplies light to the liquid crystal display panel 101. A CCFL (Cold Cathode Fluorescent Lamp) or a light emitting diode (LED) or the like is used as a light source of the backlight 103.

The signal processing device 105 processes various signals which are externally input to the liquid crystal display device 100. The signal processing device 105 is input with an image signal $i_o$ (referred to below as "first image signal $i_o$") which includes a red (R) pixel value, a green (G) pixel value and a blue (B) pixel value, a horizontal synchronization signal (HSYNC), a vertical synchronization signal (VSYNC) and a clock signal (CLK).

The signal processing device 105 converts the first image signal $i_o$ including the red (R) pixel value, the green (G) pixel value and the blue (B) pixel value into an image signal $i_c$ (referred to below as "second image signal $i_c$") including a red (R) pixel value, a green (G) pixel value, a blue (B) pixel value and a white (W) pixel value suitable for a liquid crystal display panel including the pixel 200 formed from the subpixels 201R, 201G, 201B and 201W. Here, the pixel value of the first pixel signal $i_o$ is treated as a luminosity value. In the case when the input signal is a gradation value, it is desirable to convert from the gradation value to a luminosity value. Furthermore, generally, in the case of an 8-bit signal, the following expression can be used as an example for the conversion from the gradation value to the luminosity value.

$$\text{(luminosity value)}=255\times(\text{gradation value}/(2^8-1))^{2.2}$$

Although the maximum value of the pixel value (luminosity value) is set to 255 in the explanation below, it may also be calculated by increasing the value of 255 in the expression. In addition, since the pixel value of the second image signal $i_c$ to be output is also treated as a luminosity value, the luminosity value may be converted to a gradation value before the luminosity value is input of the data drive circuit. At this time, in the case that the second image signal $i_c$ is an 8 bit signal, the following expression can be used as an example for the conversion from the luminosity value to the gradation value.

$$\text{(gradation value)}=255\times(\text{luminosity value}/(2^8-1))^{0.45}$$

The signal processing device 105 determines an elongation coefficient value α for each frame based on the first image signal $i_o$ and elongates the second image signal $i_c$ of the corresponding frame based on the determined elongation coefficient value α. The signal processing device 105 generates a backlight signal BLs which shows a light emission level of the backlight 103 based on the elongation coefficient value α. A detailed structure of the signal processing device 105 is explained later.

The signal processing device 105 may also include a signal generation part (not shown in the diagram) which generates a timing control signal based on a horizontal synchronization signal (HSYNC), a vertical synchronization signal (VSYNC) and a clock signal (CLK) and the like which are externally input to the liquid crystal display device 100. The timing control signal may include a gate drive control signal, a data drive control signal and a backlight drive control signal and the like. The signal processing device 105 outputs a gate drive control signal, a data drive control signal and a backlight drive control signal to a gate drive circuit 107, a data drive circuit 109 and a backlight drive circuit 111 described later, and controls driving of the gate drive circuit 107, the data drive circuit 109 and the backlight drive circuit 111.

The gate drive circuit 107 supplies a gate signal Gs to the gate line Gm and selectively drives each pixel 200 of the liquid crystal display panel 101. The data drive circuit 109 supplies an image voltage based on the second image signal $i_c$ to the data line Dn of each pixel 200 (each subpixel 201R, 201G, 201B and 201W). The backlight drive circuit 111 controls the light emission level of the backlight 103 based on the backlight signal BLs.

Structure of Signal Processing Device

Figure 4:
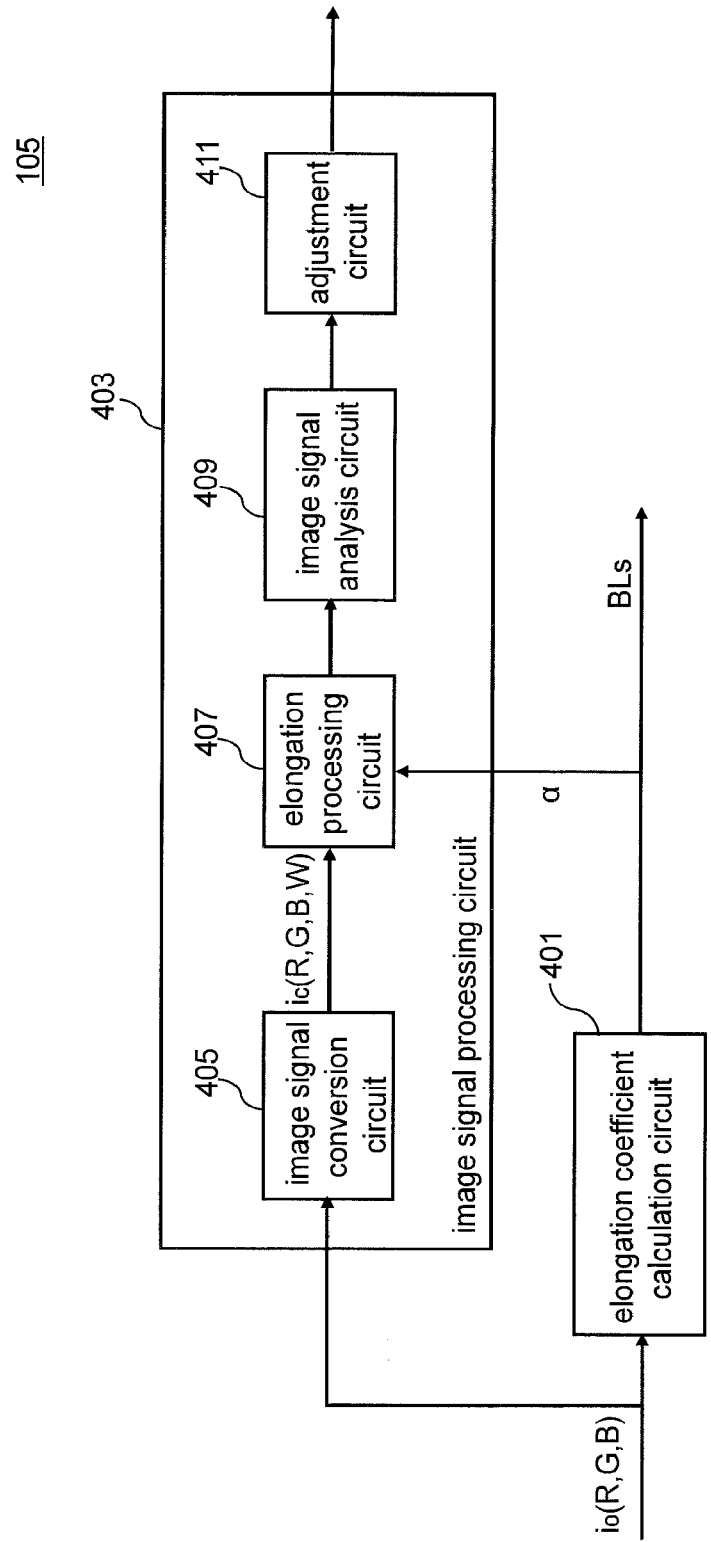
FIG. 4 is a block diagram showing an example of a structure of a signal processing device.

The structure of the signal processing device 105 is explained below in detail while referring to FIG. 4 to FIG. 9. FIG. 4 is a block diagram showing an example of the structure of the signal processing device 105. The signal processing device 105 includes an elongation coefficient calculation circuit 401 and an image signal processing circuit 403. An image signal processing circuit 403 includes an image signal conversion circuit 405, an elongation processing circuit 407, an image signal analysis circuit 409 and an adjustment circuit 411.

The elongation coefficient calculation circuit 401 determines the elongation coefficient value α based on the first image signal $i_o$. The elongation coefficient value α is determined for each frame. The elongation coefficient calculation circuit 401 determines the elongation coefficient value α of the frame based on the red (R) pixel value, the green (G) pixel value and the blue (B) pixel value included in the first image signal $i_o$. The elongation coefficient calculation circuit 401 may determine the elongation coefficient value α of the frame based on the red (R) pixel value, the green (G) pixel value and the blue (B) pixel value included in the first image signal $i_o$ for one frame. The elongation coefficient calculation circuit 401 may determine the elongation coefficient value α of one frame based on the red (R) pixel value, the green (G) pixel value and the blue (B) pixel value included in the image signal $i_o$ for one frame. The elongation coefficient calculation circuit 401 determines the elongation coefficient value α based on the maximum value among the red (R) pixel value, the green (G) pixel value and the blue (B) pixel value for one frame. For example, in the case where the minimum value among the red (R) pixel value, the green (G) pixel value and the blue (B) pixel value for one frame is less than ½ of the maximum value among the red (R) pixel value, the green (G) pixel value and the blue (B) pixel value, the expansion coefficient value α is relatively larger than in the case where the minimum value among the red (R) pixel value, the green (G) pixel value and the blue (B) pixel value for one frame is more than ½ of the maximum value among the red (R) pixel value, the green (G) pixel value, and the blue (B) pixel value for the frame. In addition, in the case when the first image signal $i_o$ for one frame includes a single color, the elongation coefficient calculation circuit 401 may set the elongation coefficient value α of that frame to 1. Furthermore, the elongation coefficient calculation circuit 401 may determine the elongation coefficient value α of the frame based on the red (R) pixel value, the green (G) pixel value and the blue (B) pixel value included in the image signal $i_o$ for a predetermined pixel in one frame. The elongation coefficient calculation circuit 401 outputs the determined elongation coefficient value α to the elongation processing circuit 407 of the image signal processing circuit 403 described later. In addition, the elongation coefficient calculation circuit 401 generates a backlight signal BLs which shows the light emission level of the backlight 103 based on the determined elongation coefficient value α, and outputs the backlight signal BLs to the backlight drive circuit 107. Here, the backlight signal BLs is a signal which shows that the light emission level of the backlight is 1/α.

The image signal conversion circuit 405 converts the first image signal $i_o$ including the red (R) pixel value, the green (G) pixel value and the blue (B) pixel value by a subpixel rendering process into a second image signal $i_c$ including a (R) pixel value, a green (G) pixel value, a blue (B) pixel value and a white (W) pixel value suitable for a liquid crystal display panel including the pixel 200 formed from four subpixels 201R, 201G, 201B and 201W. Specifically, the image signal conversion circuit 405 converts two first image signals $i_o$ with respect to two consecutive pixels each of which is formed by a red (R) subpixel, a green (G) subpixel and a blue (B) subpixel, into a second image signal $i_c$ with respect to one pixel 200 formed by four subpixels 201 R, 201 G, 201 B and 201 W.

Figure 5:
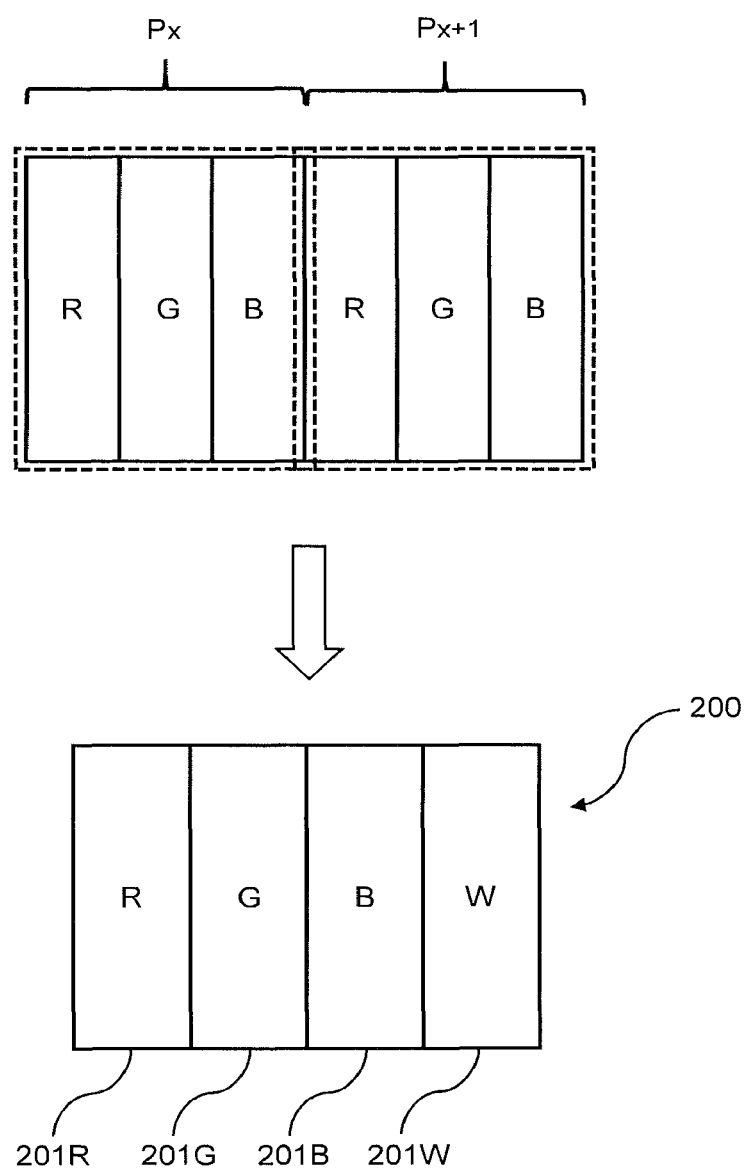
FIG. 5 is a schematic diagram for explaining the conversion of two first image signals with respect to two pixels to a second image signal.

FIG. 5 is a schematic diagram for explaining conversion of two first image signals $i_o$ with respect to two consecutive pixels into a second image signal $i_c$ by the image signal conversion circuit 405. As is shown in FIG. 5, the image signal conversion circuit 405 converts first image signals $i_o$ with respect to two consecutive pixels Px, Px+1 (x is a natural number) in a row direction each formed from a red (R) subpixel, a green (G) subpixel and a blue (B) subpixel, into a second image signal $i_c$ with respect to one pixel 200 formed from a red (R) subpixel 201R, a green (G) subpixel 201G, a blue (B) subpixel 201B and a white (W) subpixel 201W.

Figure 6:
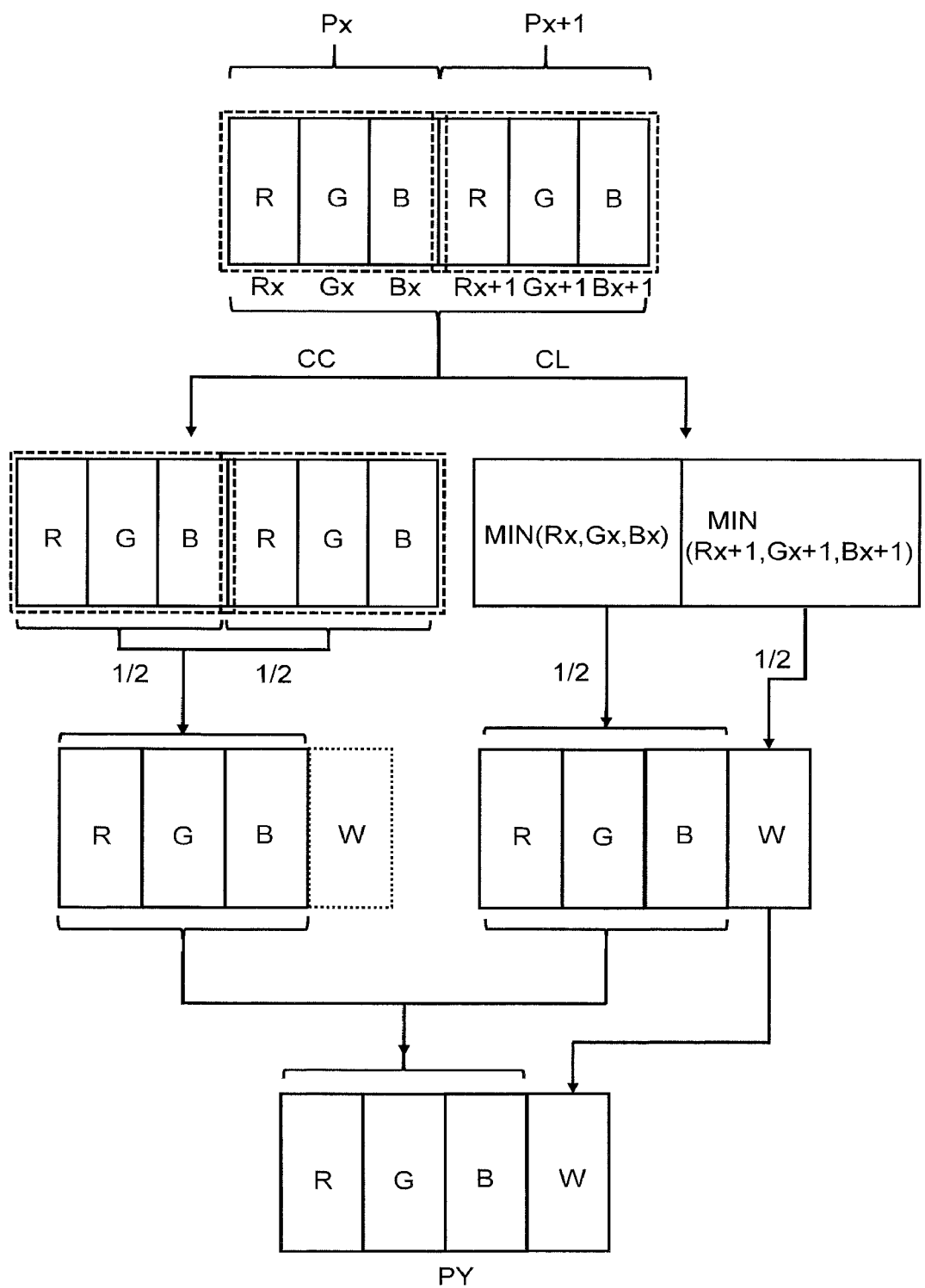
FIG. 6 is a schematic diagram for explaining an example of a method for converting two first image signals to a second image signal.
Figure 7:
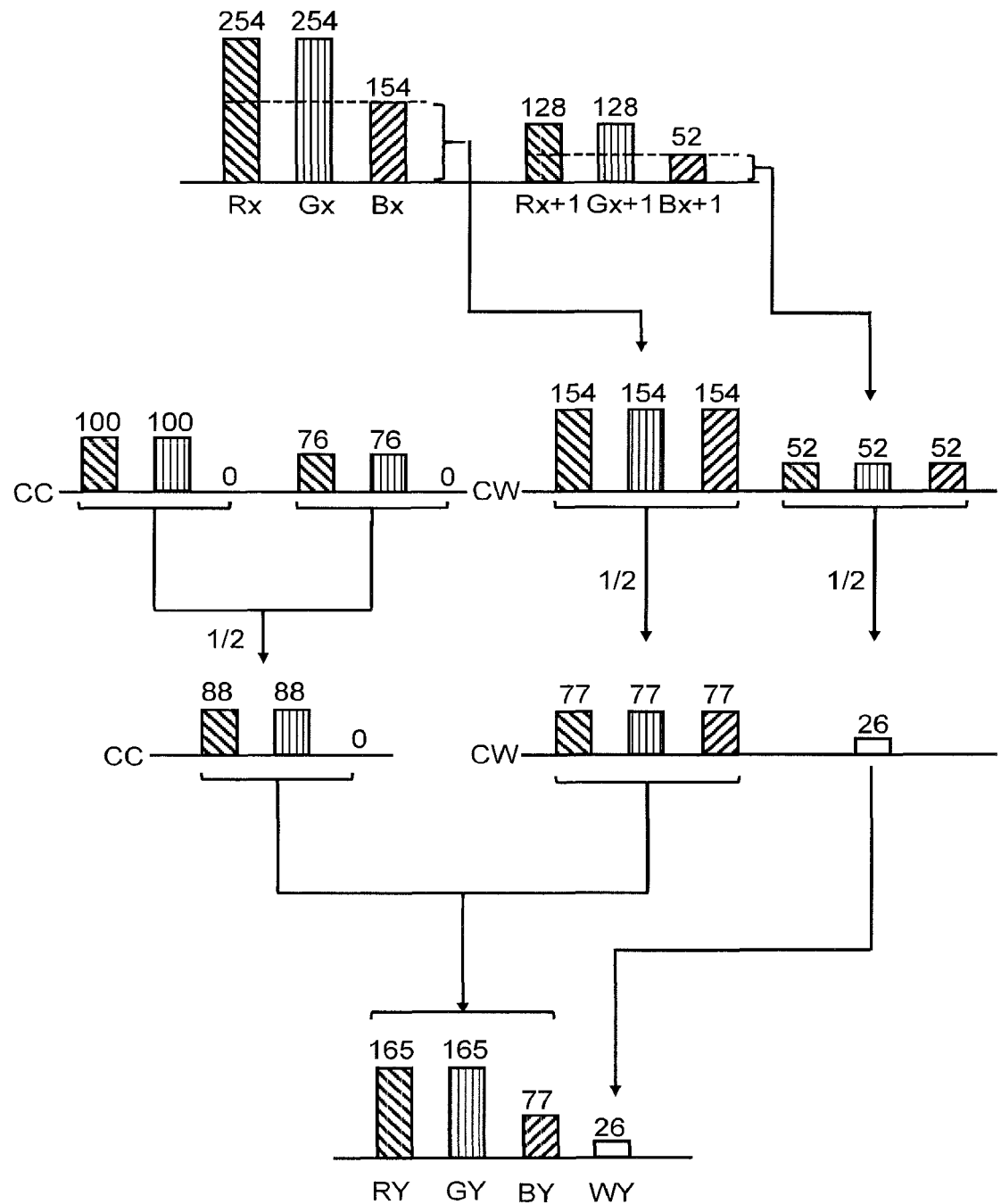
FIG. 7 is a schematic diagram for explaining an example of a method for converting two first image signals to a second image signal.

FIG. 6 and FIG. 7 are schematic diagrams for explaining an example of a method for converting two first image signals $i_o$ into a second image signal $i_c$ by the image signal conversion circuit 405. In FIG. 6 and FIG. 7, an example of a method is explained in which two first image signals $i_o$ with respect to two pixels $P_X$ and $P_{X+1}$ consecutive in a row direction each formed by a red (R) subpixel, a green (G) subpixel and a blue (B) subpixel, are converted into a second image signal $i_c$ with respect to one pixel $P_Y$ formed from a red (R) subpixel 201R, a green (G) subpixel 201G, a blue (B) subpixel 201B and a white (W) subpixel 201W. In FIG. 6 and FIG. 7, pixel values with respect to a red subpixel, a green subpixel and a blue subpixel of the pixel $P_X$ are respectively set as a first red pixel value $R_X$, a first green pixel value $G_X$ and a first blue pixel value $B_X$, and pixel values with respect to a red subpixel, a green subpixel, and a blue subpixel of the pixel $P_{X+1}$ are respectively set to a second red pixel value $R_{X+1}$, a second green pixel value $G_{X+1}$ and a third blue pixel value $B_{X+1}$.

The image signal conversion circuit 405 separates two first image signals $i_o$ with respect to two pixels $P_X$ and $P_{X+1}$ into a color component Cw and a white component Cw. The image signal conversion circuit 405 specifies a pixel value which is the minimum value (referred to below as "first minimum value") from among the first red pixel value $R_X$, the first green pixel value $G_X$ and the first blue pixel value $B_X$ included in the first image signal $i_o$ with respect to the pixel $P_X$. For example, as is shown in FIG. 7, in the case where the first red pixel value $R_X$ which is included in the first image signal $i_o$ with respect to the pixel $P_X$ is 254, the first green pixel value $G_X$ which is included in the first image signal $i_o$ with respect to the pixel $P_X$ is 254 and the first blue pixel value $B_X$ which is included in the first image signal $i_o$ with respect to the pixel $P_X$ is 154, then the first minimum value is 154 which is the first blue pixel value $B_X$.

The image signal conversion circuit 405 separates a first image signal $i_o$ with respect to a pixel $P_X$ into a color component $C_C$ and a white component $C_W$ based on the specified first minimum value 154. Specifically, the image signal conversion circuit 405 specifies the first minimum value (the first blue pixel value $B_X$) 154 as a pixel value corresponding to the white component $C_W$ of the first image signal $i_o$ with respect to a pixel $P_X$.

The image signal conversion circuit 405 sets a pixel value obtained by subtracting the first minimum value corresponding to the white component $C_W$ from each of the first red pixel value $R_X$, the first green pixel value $G_X$ and the first blue pixel value $B_X$ respectively as the color component $C_C$. In the case when the white component $C_W$ of the first red pixel value $R_X$, the first green pixel value $G_X$ and the first blue pixel value $B_X$ included in a first image signal $i_o$ with respect to a pixel $P_X$ are respectively 154, then the pixel value obtained by subtracting 154 from each of the first red pixel value $R_X$, the first green pixel value $G_X$ and the first blue pixel value $B_X$ is specified as the pixel value corresponding to the color component $C_C$ of the first image signal $i_o$ with respect to the pixel $P_X$. That is, the color component $C_C$ of the first red pixel value $R_X$ in the first image signal $i_o$ with respect to the pixel $P_X$ is 100, the color component $C_C$ of the first green pixel value $G_X$ is 100, and the color component $C_C$ of the first blue pixel value $B_X$ is 0. The color component $C_C$ of the first red pixel value $R_X$, the first green pixel value $G_X$ and the first blue pixel value $B_X$ in the first image signal $i_o$ with respect to the pixel $P_X$ are each referred to herein as a third red pixel value, a third green pixel value and a third blue pixel value respectively.

Similarly, the image signal conversion circuit 405 specifies the pixel value which is the minimum value (referred to herein as "second minimum value") from among the second red pixel value $R_{X+1}$, the second green pixel value $G_{X+1}$ and the second blue pixel value $B_{X+1}$ included in the first image signal $i_o$ with respect to the pixel $P_{X+1}$. For example, as is shown in FIG. 7, in the case when the second red pixel value $R_{X+1}$ is 128, the second green pixel value $G_{X+1}$ is 128 and the second blue pixel value $B_{X+1}$ is 52 included in the first image signal $i_o$ with respect to the pixel $P_{X+1}$, then the second minimum value is 52 which is the second blue pixel value $B_{X+1}$.

The image signal conversion circuit 405 separates the first image signal $i_o$ with respect to the pixel $P_{X+1}$ into a color component $C_C$ and a white component $C_W$ based on the specified second minimum value 52. Specifically, the image signal conversion circuit 405 specifies the second minimum value (the second blue pixel value $B_{X+1}$) 52 as a pixel value corresponding to the white component $C_W$ of the first image signal $i_o$ in the pixel $P_{X+1}$.

The image signal conversion circuit 405 sets the pixel value obtained by subtracting the second minimum value corresponding to the white component $C_W$ from each of the second red pixel value $R_{X+1}$, the second green pixel value $G_{X+1}$ and the second blue pixel value $B_{X+1}$ as the color component $C_C$. In the case when the white component $C_W$ of each of the second red pixel value $R_{X+1}$, the second green pixel value $G_{X+1}$ and the second blue pixel value $B_{X+1}$ included in the first image signal $i_o$ with respect to the pixel $P_{X+1}$ is 52, a pixel value obtained by subtracting 52 from each of the second red pixel value $R_{X+1}$, the second green pixel value $G_{X+1}$ and the second blue pixel value $B_{X+1}$ is specified as the pixel value corresponding to the color component $C_C$ of the first image signal $i_o$ with respect to the pixel $P_{X+1}$. That is, the color component $C_C$ of the second red pixel value $R_{X+1}$ is 76, the color component $C_C$ of the second green pixel value $G_{X+1}$ is 76 and the color component $C_C$ of the second blue pixel value $B_{X+1}$ is 0 in the first image signal $i_o$ with respect to the pixel $P_{X+1}$. The color component of the second red pixel value $R_{X+1}$, the second green pixel value $G_{X+1}$ and the second blue pixel value $B_{X+1}$ in the first image signal $i_o$ with respect to the pixel $P_{X+1}$ are each referred below to as fourth red pixel value, fourth green pixel value pixel value and fourth blue pixel value respectively.

The image signal conversion circuit 405 calculates each average value of the third red pixel value, the third green pixel value and the third blue pixel value which are the color components $C_C$ of the first red pixel value $R_X$, the first green pixel value $G_X$ and the first blue pixel value $B_X$ in the first image signal $i_o$ with respect to the pixel $P_X$, and the fourth red pixel value, the fourth green pixel value and the fourth blue pixel value, which are the color components $C_C$ of the second red pixel value $R_{X+1}$, the second green pixel value $G_{X+1}$ and the second blue pixel value $B_{X+1}$ in the first image signal $i_o$ with respect to the pixel $P_{X+1}$. That is, the image signal conversion circuit 405 calculates each of the average value (referred to herein as the "average red pixel value") between the third red pixel value and the fourth red pixel value, the average value (referred to herein as the "average green pixel value") between the third green pixel value and the fourth green pixel value, and the average value (referred to herein as the "average blue pixel value") between the third blue pixel value and the fourth blue pixel value. For example, as is shown in FIG. 7, in the case when the third red pixel value is 100, the third green pixel value is 100, the third blue pixel value is 0, the fourth red pixel value is 76, the fourth green pixel value is 76 and the fourth blue pixel value is 0, then the average red pixel value is 88, the average green pixel value is 88 and the average blue pixel value is 0.

The image signal conversion circuit 405 multiplies by ½ each of the first minimum values which is the white component $C_W$ of the first red pixel value $R_X$, the first green pixel value $G_X$ and the first blue pixel value $B_X$ in the first image signal $i_o$ with respect to the pixel $P_X$ and the second minimum value which is the white component $C_W$ of the second red pixel value $R_{X+1}$, the second green pixel value $G_{X+1}$ and the second blue pixel value $B_{X+1}$ in the image signal $i_o$ with respect to the pixel $P_{X+1}$. The image signal conversion circuit 405 calculates one of the first minimum value multiplied by ½ and the second minimum value multiplied by ½ as a white pixel value $W_Y$ of the second image signal $i_c$ with respect to the pixel $P_Y$ which is formed from a red subpixel, a green subpixel, a blue subpixel and a white subpixel, and calculates the other as a white component in a red pixel value $R_Y$, green pixel value $G_Y$ and the blue pixel value $B_Y$ of the second image signal $i_c$ with respect to the pixel $P_Y$. As is shown in FIG. 7, here, 26 which is ½ of the second minimum value 52 is set as the white pixel value $W_Y$ of the second image signal $i_c$ with respect to the pixel $P_Y$.

The image signal conversion circuit 405 increases the average red pixel value, the average green pixel value and the average blue pixel value based on the other of the first minimum value multiplied by ½ and the second minimum value multiplied by ½ to calculate the red pixel value $R_Y$, the green pixel value $G_Y$ and the blue pixel value $B_Y$ of the second image signal $i_c$ with respect to the pixel $P_Y$. As is described above, the other one of the first minimum value multiplied by ½ and the second minimum value multiplied by ½ is the white component in the red pixel value $R_Y$, the green pixel value $G_Y$ and the blue pixel value $B_Y$ of the second image signal $i_c$ with respect to the pixel $P_Y$. As is shown in FIG. 7, here, the average red pixel value 88, the average green pixel value 88 and the average blue pixel value 0 are increased based on 77 which is ½ of the first minimum value 154. That is, the red pixel value $R_Y$, the green pixel value $G_Y$ and the blue pixel value $B_Y$ of the second image signal $i_c$ with respect to the pixel $P_Y$ have the value 77 which is the white component $C_W$ in each of the average red pixel value 88, the average green pixel value 88 and the average blue pixel value 0. Therefore, the red pixel value $R_Y$ of the second image signal $i_c$ with respect to the pixel $P_Y$ is 165, the green pixel value $G_Y$ is 165 and the blue pixel value $B_Y$ is 77.

As is described above, the white component $C_W$ of the pixel $P_X$ is reflected in the pixel $P_Y$ by calculating the red pixel value $R_Y$, the green pixel value $G_Y$ and the blue pixel value $B_Y$ of the second image signal $i_c$ with respect to the pixel $P_Y$ based on the first minimum value which is the white component $C_W$ of the red pixel value $R_X$, the green pixel value $G_X$, and the blue pixel value $B_X$ in the first image signal $i_o$ with respect to the pixel $P_X$. In addition, the second minimum value which is the white component $C_W$ of the red pixel value $R_{X+1}$, the green pixel value $G_{X+1}$ and the blue pixel value $B_{X+1}$ of the first image signal $i_o$ with respect to the pixel $P_{X+1}$ is set as the white pixel value $W_Y$ of second image signal $i_c$. In this way, it is possible to reflect the luminosity ratio of the pixel $P_X$ and the pixel $P_{X+1}$ based on the first image signal $i_o$ in the luminosity ratio between a red subpixel, green subpixel, blue subpixel and white subpixel of the pixel $P_Y$. In this way, with respect to at least the white component, the pixel $P_Y$ can express the resolution of two pixels of an input signal.

As is described above, the image signal conversion circuit 405 converts two first image signals $i_o$ with respect to two pixels continuous in a row direction into a second image signal $i_c$. Furthermore, the conversion process from the first image signal $i_o$ to the second image signal $i_c$ described above is merely an example, and the present invention is not limited to this example. The image signal conversion circuit 405 outputs the second image signal $i_c$ including the calculated red pixel value $R_Y$, green pixel value $G_Y$, blue pixel value $B_Y$ and white pixel value $W_Y$ of the pixel $P_Y$ to the elongation processing circuit 407.

The elongation processing circuit 407 obtains the second image signal $i_c$ including the red pixel value $R_Y$, the green pixel value $G_Y$, the blue pixel value $B_Y$ and the white pixel value $W_Y$ from the image signal conversion circuit 405. In addition, the elongation processing circuit 407 obtains the elongation coefficient value α from the elongation coefficient calculation circuit 401. The elongation processing circuit 407 elongates the second image signal $i_c$ based on the elongation coefficient value α. Specifically, the elongation processing circuit 407 elongates the red pixel value $R_Y$, the green pixel value $G_Y$, the blue pixel value $B_Y$ and the white pixel value $W_Y$ included in the second image signal $i_c$ based on the elongation coefficient value α. The elongation processing circuit 407 outputs the second image signal $i_c$ including the red pixel value $R_Y$, the green pixel value $G_Y$, the blue pixel value $B_Y$ and the white pixel value $W_Y$ which are elongated based on the elongation coefficient value α to the image signal analysis circuit 409.

The image signal analysis circuit 409 obtains the second image signal $i_c$ including the elongated red pixel value $R_Y$, the elongated green pixel value $G_Y$, the elongated blue pixel value $B_Y$ and the elongated white pixel value $W_Y$ from the elongation processing circuit 407. The image signal analysis circuit 409 analyzes the second image signal $i_c$ including the elongated red pixel value $R_Y$, the elongated green pixel value $G_Y$, the elongated blue pixel value $B_Y$ and the elongated white pixel value $W_Y$ to determine whether the elongated red pixel value $R_Y$, the elongated green pixel value $G_Y$, and the elongated blue pixel value $B_Y$ included in the second image signal $i_c$ are equal to or less than a predetermined threshold.

Figure 8:
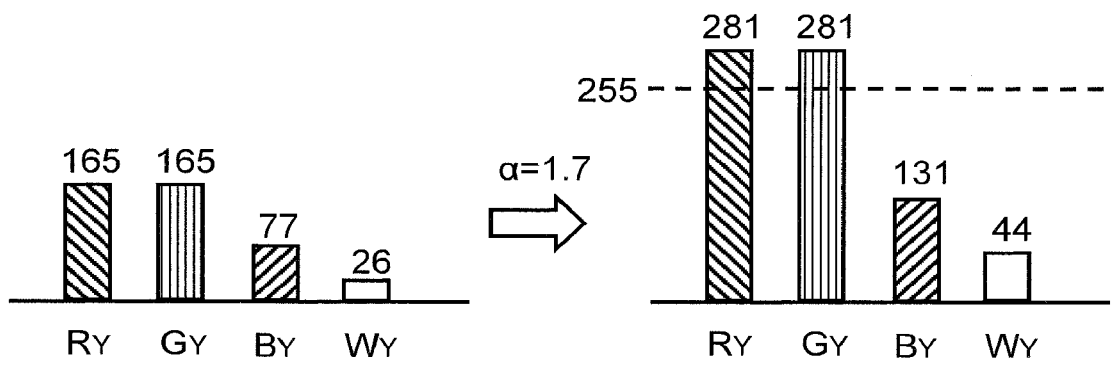
FIG. 8 is schematic diagram for explaining an analysis of an elongated second image signal.

FIG. 8 is a schematic diagram for explaining the analysis of an elongated second image signal $i_c$ performed by the image signal analysis circuit 409. As an example, the case where the elongation coefficient value α is 1.7 is explained. In the case when the red pixel value $R_Y$ is 165, the green pixel value $G_Y$ is 165, the blue pixel value $B_Y$ is 77 and the white pixel value $W_Y$ is 26 of the second image signal $i_c$ with respect to the pixel $P_Y$, then the red pixel value $R_Y$ is 282, the green pixel value $G_Y$ is 282, the blue pixel value $B_Y$ is 131 and the white pixel value $W_Y$ is 44 included in the elongated second image signal $i_c$ output from the elongation processing circuit 407 (decimal places are rounded off.) The image signal analysis circuit 409 determines whether or not the red pixel value $R_Y$, the green pixel value $G_Y$ and the blue pixel value $B_Y$ included in the elongated second image signal $i_c$ are equal to or less than the predetermined threshold values. Here, it is assumed that the predetermined threshold value is 255. In this case, the image signal analysis circuit 409 determines that among the red pixel value $R_Y$, the green pixel value $G_Y$, and the blue pixel value $B_Y$ included in the elongated second image signal $i_c$, the red pixel value $R_Y$ and the green pixel value $G_Y$ exceed the threshold value.

The image signal analysis circuit 409 outputs the elongated second image signal $i_c$, and a signal which shows whether the red pixel value $R_Y$, the green pixel value $G_Y$ and the blue pixel value $B_Y$ included in the elongated second image signal $i_c$ are equal to or less than a predetermined threshold value to the adjustment circuit 411.

The adjustment circuit 111 obtains the elongated second image signal $i_c$ from the image signal analysis circuit 409, and the signal which shows that the red pixel value $R_Y$, the green pixel value $G_Y$ and the blue pixel value $B_Y$ included in the elongated second image signal $i_c$ are equal to or less than a predetermined threshold value. In the case when the red pixel value $R_Y$, the green pixel value $G_Y$ and the blue pixel value $B_Y$ included in the elongated second image signal $i_c$ are equal to or less than a predetermined threshold value, then the adjustment circuit 411 outputs the elongated second image signal $i_c$ obtained from the image signal analysis circuit 409 as it is to the data drive circuit 109. On the other hand, in the case when at least one of the red pixel value $R_Y$, the green pixel value $G_Y$ and the blue pixel value $B_Y$ included in the elongated second image signal $i_c$ exceed a predetermined threshold value, then the adjustment circuit 411 adjusts the red pixel value $R_Y$, the green pixel value $G_Y$, the blue pixel value $B_Y$ and a white pixel value $W_Y$ included in the elongated second image signal $i_c$ based on the amount of excess with respect to the threshold value. In the case when there are a plurality of pixel values among the red pixel value $R_Y$, the green pixel value $G_Y$ and the blue pixel value $B_Y$ included in the elongated second image signal $i_c$ which exceed a predetermined threshold value, then the adjustment circuit 411 adjusts the red pixel value $R_Y$, the green pixel value $G_Y$, the blue pixel value $B_Y$ and the white pixel value $W_Y$ based on the maximum amount of excess.

Figure 9:
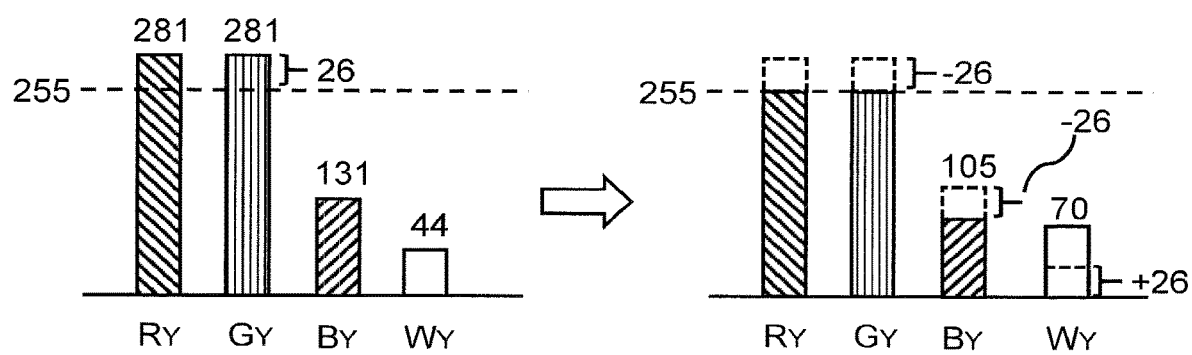
FIG. 9 is schematic diagram for explaining an adjustment of a second image signal after elongation.

FIG. 9 is a schematic diagram for explaining adjustment of the elongated second image signal $i_c$ performed by the adjustment circuit 411. In the case when the red pixel value $R_Y$ and the green pixel value $G_Y$ among the red pixel value $R_Y$, the green pixel value $G_Y$ and the blue pixel value $B_Y$ included in the elongated second image signal $i_c$ exceed a predetermined threshold value, then the adjustment circuit 411 adjusts the red pixel value $R_Y$, green pixel value $G_Y$, blue pixel value $B_Y$ and white pixel value $W_Y$ included in the elongated second image signal $i_c$ based on the amount of excess by which a threshold value is exceeded by one of the red pixel value $R_Y$ and the green pixel value $G_Y$. Here, in the case when the red pixel value $R_Y$ is 282, the green pixel value $G_Y$ is 282, the blue pixel value $B_Y$ is 131 and the white pixel value $W_Y$ is 44 included in the elongated second image signal $i_c$, the amount of excess of a threshold value with respect to a red pixel value $R_Y$ and the green pixel value $G_Y$ are both 26. Therefore, the adjustment circuit 411 adjusts the red pixel value $R_Y$, the green pixel value $G_Y$, the blue pixel value $B_Y$ and the white pixel value $W_Y$ included in the elongated second image signal $i_c$ based on the amount of excess 26 with respect to a threshold value of the red pixel value $R_Y$ and the green pixel value $G_Y$.

The adjustment circuit 411 reduces the excess amount 26 with respect to the predetermined threshold value of the red pixel value $R_Y$ and the green pixel value $G_Y$ from the red pixel value $R_Y$, the green pixel value $G_Y$ and the blue pixel value $B_Y$ included in the elongated second image signal $i_c$. That is, the adjustment circuit 411 adjusts the red pixel value $R_Y$, the green pixel value $G_Y$ and the blue pixel value $B_Y$ included in the elongated second image signal $i_c$ so that they are equal to or less than a predetermined threshold value.

The red pixel value $R_Y$ after adjustment is 255, the green pixel value $G_Y$ after adjustment is 255, and the blue pixel value $B_Y$ after adjustment is 105. On the other hand, the adjustment circuit 411 increases the white pixel value $W_Y$ included in the elongated second image signal $i_c$ by the amount of excess 26 with respect to the predetermined threshold value of the red pixel value $R_Y$ and the green pixel value $G_Y$. The white pixel value $W_Y$ included in the elongated second image signal $i_c$ after the adjustment is 70.

As is described above, in the case when the red pixel value $R_Y$ and the green pixel value $G_Y$ among the red pixel value $R_Y$, the green pixel value $G_Y$, and the blue pixel value $B_Y$ included in the elongated second image signal $i_c$ exceed a predetermined threshold value, then the adjustment circuit 411 adjusts the red pixel value $R_Y$, the green pixel value $G_Y$, the blue pixel value $B_Y$ and the white pixel value $W_Y$ included in the elongated second image signal $i_c$ based on the amount of excess with respect to the predetermined threshold value. In this way, it is possible to prevent a hue shift due to an overflow of an image based on the second image signal $i_c$. The adjustment circuit 411 outputs the second image signal $i_c$ including the red pixel value $R_Y$, the green pixel value $G_Y$, the blue pixel value $B_Y$ and the white pixel value $W_Y$ after adjustment to the data drive circuit 109.

The data drive circuit 109 generates an image voltage based on the second image signal $i_c$ obtained from the adjustment circuit 411 and supplies the generated image voltage to the data line Dn. That is, in the case when the red pixel value $R_Y$, the green pixel value $G_Y$ and the blue pixel value $B_Y$ included in the elongated second image signal $i_c$ are equal to or less than a predetermined threshold value, then the data drive circuit 109 generates an image voltage based on the elongated second image signal $i_c$ obtained from the adjustment circuit 411. On the other hand, in the case when any one of the red pixel value $R_Y$, the green pixel value $G_Y$ and the blue pixel value $B_Y$ included in the elongated second image signal $i_c$ exceeds a predetermined threshold value, then the data drive circuit 109 generates an image voltage based on the adjusted second image signal $i_c$ which is adjusted by the adjustment circuit 411 based on the amount of excess with respect to the predetermined threshold value.

The backlight drive circuit 111 controls the light emission level of the backlight 103 based on a backlight signal BLs which shows that the light emission level of the backlight is $1/\alpha$, which is obtained from the elongation coefficient calculation circuit 401. In the case where $1/\alpha$ is less than 1, it is possible to reduce the power consumption of the backlight 103.

Furthermore, by adjusting the red pixel value $R_Y$, the green pixel value $G_Y$, the blue pixel value $B_Y$ and the white pixel value $W_Y$ included in the elongated second image signal $i_c$ based on the amount of excess, there is a fear that the resolution of the original white component will become worse. However, overflow occurs when two adjacent pixel values are both high pixel values, and in an edge part where there is influence on the resolution of the image, either pixel value between the two adjacent pixels definitely becomes low. Therefore, in the edge part, even if the white component of the first image $i_c$ with respect to the two pixels is distributed to a red (R) pixel value, a green (G) pixel value, a blue (B) pixel value and a white (W) pixel value, overflow does not easily occur. As a result, even if this means is used, it is possible to maintain the resolution of an area such as an edge where a resolution is influenced.

As is described above, in the liquid crystal display device 100 according to one embodiment of the present invention, it is possible to reduce power consumption in the backlight 103 by setting the light emission level of the backlight 103 to 1/α based on the elongation coefficient value α determined according to a first image signal $i_c$ which is input externally. In addition, a first image signal $i_c$ including a red (R) pixel value, a green (G) pixel value and a blue (B) pixel value is converted into a second image signal $i_c$ including a red (R) pixel value, a green (G) pixel value, a blue (B) pixel value and a white (W) pixel value, the second image signal $i_c$ is elongated based on the elongation coefficient value α, and the second image signal $i_c$ after elongation is adjusted based on the amount of excess with respect to a predetermined threshold value of the elongated second image signal $i_c$. In this way, it is possible to prevent a shift in hue of an image based on the second image signal $i_c$ and maintain resolution. Therefore, in the liquid crystal display device 100, it is possible to maintain display performance of an image while reducing power consumption of the backlight 103.

A person skilled in the art could appropriately add, delete or change the design of constituent elements on the basis of the display device of the embodiments of the present invention described above, or processes which are added, omitted or changed or a change in conditions are within the scope of the present invention as long as they contain the gist of the present invention. In addition, even other actions and effects different from the actions and effects brought about by each embodiment described above which are obvious from the description of the present specification or those easily predictable by a person skilled in the art ae to be interpreted as naturally being brought about by the present invention.

What is claimed is:

1. A signal processing device comprising:
    an elongation coefficient calculation circuit receiving a first image signal including a red pixel value, a green pixel value and a blue pixel value, and determining an elongation coefficient value with respect to one frame based on the first image signal; and
    an image signal processing circuit receiving the first image signal and the elongation coefficient value;
    wherein the image signal processing circuit includes
    an image signal conversion circuit converting two of the first image signals into a second image signal including a red pixel value, a green pixel value, a blue pixel value and a white pixel value;
    an elongation processing circuit elongating the second image signal based on the elongation coefficient value;
    an image signal analysis circuit analyzing the elongated second image signal to determine whether the red pixel value, the green pixel value and the blue pixel value included in the second image signal are a predetermined threshold value or less; and
    an adjustment circuit adjusting the elongated second image signal based on an amount of excess with respect to the predetermined threshold value in the case where any one among the red pixel value, the green pixel value and the blue pixel value included in the second image signal exceed the predetermined threshold value;
    wherein the image signal conversion circuit,
    specifies a first minimum value, the first minimum value being a minimum value among a first red pixel value, a first green pixel value and a first blue pixel value included in the first image signal among the two first image signals,
    specifies a second minimum value, the second minimum value being a minimum value among a second red pixel value, a second green pixel value and a second blue pixel value included in the other first image signal among the two first image signals,
    calculates a white pixel value of the second image signal based on one of the first minimum value and the second minimum value, and
    calculates a red pixel value, a green pixel value and a blue pixel value of the second image signal based on the other of the first minimum value and the second minimum value, a difference value between the first minimum value and each of the first red pixel value, the first green pixel value and the first blue value respectively, and a difference value between the second minimum value and each of the second red pixel value, the second green pixel value and the second blue value respectively.

2. The signal processing device according to claim 1, wherein the image signal conversion circuit
    reduces the first red pixel value, the first green pixel value and the first blue pixel value based on the first minimum value to calculate the third red pixel value, the third green pixel value and the third blue pixel value,
    reduces the second red pixel value, the second green pixel value and the second blue pixel value based on the second minimum value to calculate the fourth red pixel value, the fourth green pixel value and the fourth blue pixel value,
    calculates an average red pixel value, the average red pixel value being an average value of the third red pixel value and the fourth red pixel value, calculates an average green pixel value, the average green pixel value being an average value of the third green pixel value and the fourth green pixel value, and calculates an average blue pixel value, the average blue pixel value being an average value of the third blue pixel value and the fourth blue pixel value, and
    calculates a red pixel value, a green pixel value and a blue pixel value of the second image signal by increasing the average red pixel value, the average green pixel value and the average blue pixel value based on the other of the first minimum value and the second minimum value.

3. The signal processing device according to claim 1, wherein the adjustment circuit reduces the red pixel value, the green pixel value, the blue pixel value included in the second image signal and increases the white pixel value included in the second image signal based on an amount of excess with respect to the predetermined threshold value in the case where any one among the red pixel value, the green pixel value and the blue pixel value included in the second image signal exceeds the predetermined threshold value.

4. The signal processing device according to claim 1, wherein the elongation coefficient calculation circuit determines the elongation coefficient value based on a maximum value among the red pixel value, the green pixel value and the blue pixel value included in the first image signal with respect to one frame.

5. A display device comprising:
    a display panel displaying an image;
    a backlight supplying light to the display panel;
    a data drive circuit supplying an image voltage to the display panel;
    a backlight drive circuit driving the backlight; and
    a signal processing device;
    wherein
    the signal processing device includes
    an elongation coefficient calculation circuit receiving a first image signal including a red pixel value, a green pixel value and a blue pixel value, and determining an elongation coefficient value with respect to one frame based on the first image signal of one frame, and an image signal processing circuit receiving the first image signal and the elongation coefficient value;

the image signal processing circuit includes an image signal conversion circuit converting two of the first image signals into a second image signal including a red pixel value, a green pixel value, a blue pixel value and a white pixel value, an elongation processing circuit elongating the second image signal based on the elongation coefficient value, an image signal analysis circuit analyzing the elongated second image signal to determine whether the red pixel value, the green pixel value and the blue pixel value included in the second image signal are a predetermined threshold value or less, and an adjustment circuit reducing the red pixel value, the green pixel value, the blue pixel value and increasing the white pixel value included in the second image signal based on an amount of excess with respect to the predetermined threshold value in the case where any one among the red pixel value, the green pixel value and the blue pixel value included in the second image signal exceeds the predetermined threshold value;

the backlight drive circuit drives the backlight based on the elongated coefficient value;

the data drive circuit generates the image voltage based on the second image signal adjusted by the adjustment circuit based on the amount of excess with respect to the predetermined threshold value in the case where any one of the elongated second image signal or the red pixel value, the green pixel value and the blue pixel value included in the second image signal exceeds the predetermined threshold value; and the image signal conversion circuit specifies a first minimum value, the first minimum value being a minimum value among a first red pixel value, a first green pixel value and a first blue pixel value included in the first image signal among the two first image signals, specifies a second minimum value, the second minimum value being a minimum value among a second red pixel value, a second green pixel value and a second blue pixel value included in the other first image signal among the two first image signals, calculates a white pixel value of the second image signal based on one of the first minimum value and the second minimum value, and calculates a red pixel value, a green pixel value and a blue pixel value of the second image signal based on the other of the first minimum value and the second minimum value, a difference value between the first minimum value and each of the first red pixel value, the first green pixel value and the first blue value respectively, and a difference value between the second minimum value and each of the second red pixel value, the second green pixel value and the second blue value respectively.

6. The display device according to claim 5, wherein the image signal conversion circuit reduces the first red pixel value, the first green pixel value and the first blue pixel value based on the first minimum value to calculate the third red pixel value, the third green pixel value and the third blue pixel value, reduces the second red pixel value, the second green pixel value and the second blue pixel value based on the second minimum value to calculate the fourth red pixel value, the fourth green pixel value and the fourth blue pixel value, calculates an average red pixel value, the average red pixel value being an average value of the third red pixel value and the fourth red pixel value, calculates an average green pixel value, the average green pixel value being an average value of the third green pixel value and the fourth green pixel value, and calculates an average blue pixel value, the average blue pixel value being an average value of the third blue pixel value and the fourth blue pixel value, and calculates a red pixel value, a green pixel value and a blue pixel value of the second image signal by increasing the average red pixel value, the average green pixel value and the average blue pixel value based on the other of the first minimum value and the second minimum value.

7. The display device according to claim 5, wherein the adjustment circuit reduces the red pixel value, the green pixel value, the blue pixel value included in the second image signal and increases the white pixel value included in the second image signal based on an amount of excess with respect to the predetermined threshold value is exceeded in the case where any one among the red pixel value, the green pixel value and the blue pixel value included in the second image signal exceeds the predetermined threshold value.

8. The display device according to claim 5, wherein the elongation coefficient calculation circuit determines the elongation coefficient value based on a maximum value among the red pixel value, the green pixel value and the blue pixel value included in the first image signal with respect to one frame.

* * * * *